US005360657A

United States Patent [19]

Kano et al.

[11] Patent Number: 5,360,657

[45] Date of Patent: Nov. 1, 1994

[54] COATED PRINTING PAPER AND PROCESS FOR PRODUCING THE SAME

[75] Inventors: Isao Kano; Hideki Fujiwara; Katsuhiko Matsunaga; Kunio Hata, all of Tokyo, Japan

[73] Assignee: Jujo Paper Co., Ltd., Tokyo, Japan

[21] Appl. No.: 977,121

[22] Filed: Nov. 16, 1992

Related U.S. Application Data

[63] Continuation-in-part of Ser. No. 493,802, Mar. 15, 1990, Pat. No. 5,215,812.

[30] Foreign Application Priority Data

Nov. 27, 1989 [JP] Japan .................................. 1-307888

[51] Int. Cl.[5] .......................... B32B 3/00; B32B 5/16; B32B 23/08; D21H 19/44

[52] U.S. Cl. .................................... 428/207; 428/219; 428/323; 428/339; 428/507

[58] Field of Search ............... 428/507, 219, 323, 206, 428/207, 339

[56] References Cited

U.S. PATENT DOCUMENTS 3,028,258 4/1962 Rice .
3,312,564 4/1967 Barbour .
3,779,800 12/1973 Heiser .
4,198,471 4/1980 Nelson .
4,317,849 3/1982 Ogura et al. .
4,370,389 1/1983 Ogura et al. .

FOREIGN PATENT DOCUMENTS 59-22683 2/1984 Japan .
2140271 5/1990 Japan .
3097997 4/1991 Japan .

OTHER PUBLICATIONS

J. W. Vanderhoff, "Mechanism of Film Formation of Latices", Br. Polym. J., 1970, vol. 2, May.

*Primary Examiner*—P. C. Sluby
*Attorney, Agent, or Firm*—Sherman and Shalloway

[57] ABSTRACT

A process is provided for producing a coated printing paper by first applying a pigment containing layer, superposing thereon a surface layer of a thermoplastic latex having a second-order transition of at least 80° C. and an average particle size of smaller than 100 nm to produce a coated printing paper having both superior printability and gloss. Another process is provided for producing a coated printing paper by first applying a pigment containing layer, superposing thereon a surface layer of a thermoplastic latex having a second-order transition of at least 80° C. an average particle size of smaller than 100 nm and lubricants, and treating the surface layer with a calender at a temperature, to produce a coated printing paper having both superior printability and high gloss.

9 Claims, 1 Drawing Sheet

COATED PRINTING PAPER AND PROCESS FOR PRODUCING THE SAME

RELATED CASE

This application is a continuation-in-part of prior copending application Ser. No. 07/493,802, filed Mar. 15, 1990, now U.S. Pat. No. 5,215,812.

BACKGROUND OF THE INVENTION

1. Field of the Invention

The present invention relates to a high gloss paper having a superior printability and to a process for the production thereof.

2. Prior Art

Paper having a coating composed of pigment and binder are used as high grade printing paper when the surface gloss is an important factor, in addition to printability, including ink absorbency, coated layer strength, etc. For enhancing the gloss, however, smoothing the coated layer with a press causes the destruction of voids therein, thereby lowering the ink absorbency. For enhancing the gloss, the use of a large amount of water soluble or dispersible polymer, such as polymeric latex, which is used as the binder for pigment, increases strength and gloss of the coated layer, but lowers its ink absorbency by decreasing the voids. The type and amount of pigment and binder, the amount of coating material, the degree of smoothing treatment and the like are determined based on a consideration of an appropriate balance of gloss and printability. Therefore, other techniques are required for the production of a high gloss paper having a superior printability.

The gloss value of the coated printing paper is generally increased in the following order: slightly coated paper, coated paper, art paper, superart paper and cast coated paper. The term "high gloss" as used herein means a higher gloss value than that of superart papers. Accordingly, "a high gloss paper" means a coated printing paper having a higher gloss value than that of superart paper. Conventionally, a cast coater is used for the production of high gloss papers. The cast coater applies a wet layer composed of pigment and binder by press contacting the paper with a cast drum having a mirror finish. The coated paper is dried by heating. This method has disadvantages including a remarkably slower production speed compared with methods used for the production of conventional art papers, coated papers, and slightly coated papers.

Further, a method using a heated calender without using cast drums is well known. For example, Japanese Patent Laid Open Application No. 56-68188, Japanese Patent Publication Nos. 64-10638 and 64-11758 disclose a method for coating a mixture of pigment and polymeric latex or water soluble polymer, drying the resultant coated layer, and further treating the coated layer with a heated calender. In this case, the polymeric latex having a glass transition temperature of a least 5° C. or at least 38° C. is used as the latex, and the temperature of a heated calender is set at a temperature higher than the glass transition temperature of the latex. Since this method uses a calender treatment of a latex, it is simplified and superior in productivity, but it has as a defect an insufficient gloss. This method does not provide a higher gloss than that of superart papers, and, therefore, it does not provide the same gloss as that of cast coated papers.

Another paper coating is disclosed in Japanese Patent Laid Open Application No. 59-22683. This method comprises coating a combination of at least two polymeric latexes having various minimum film-forming temperatures on an uncoated sheet, or on a coated sheet, drying the coated sheet, and optionally smoothing the sheet with a calender. In this case, drying of combined latexes having various minimum film forming temperatures causes fine cracks on the surface of the coated paper, thereby resulting in a superior ink absorbency without impairing the gloss. The important feature of the above technique is in causing fine cracks on the surface of the coated sheet, wherein special care must be exercised in the drying step. That is, the drying condition must be set so as to completely melt the latex having a higher minimum film forming temperature and, only partly melt the latex having a lower minimum film forming temperature. However, as is well known, the drying conditions are easily varied by many factors. Considering industrial application of this technique, it is practically impossible to keep the drying conditions uniform and constant over an entire production system. Therefore, it is very difficult to maintain a constant stable quality.

SUMMARY OF THE INVENTION

It is the primary object of the invention to provide a coated printing paper having both superior printability and gloss without requiring a smoothing treatment. Another object of the invention is to provide a coated printing paper having both superior printability and high gloss by means of a super calender, gloss calender, and the like.

Still another object of this invention is to provide a process for preparing glossy paper with good printability and higher gloss than super-art paper at high productivity and without adhesion of the paper to calender rolls.

These and other objects of the invention are achieved by providing, according to a first embodiment of the invention, a coated printing paper which comprises a substrate, a pigmented layer applied to the substrate and superposed thereon a surface layer comprising thermoplastic polymeric latex having a second order transition temperature of at least 80° C. and an average particle size of smaller than 100 nm. According to another embodiment of the invention, there is provided a coated printing paper which comprises a substrate, a pigmented layer, formed on the substrate, and coated thereon a surface layer of a thermoplastic polymeric latex having a second order transition temperature of at least 80° C. and an average particle size of smaller than 100 nm, the surface layer being calendered at a temperature less than the second order transition temperature.

The present invention also provides a process for preparing the high gloss coated printing papers. According to the first embodiment, the coated paper is prepared by applying to a substrate a pigmented layer, and superposing thereon a surface layer comprising a thermoplastic polymeric latex having a second order transition temperature of at least 80° C. and an average particle size of smaller than 100 nm. According to this process, a calendering treatment is not required.

According to the second embodiment, a calendering treatment is applied to the latex surface layer coated paper, the calendering treatment being effected at a temperature which is lower than the second order transition temperature of the latex. The surface layer, according to this embodiment, will preferably include a lubricant, in addition to the thermoplastic polymeric latex.

In still another embodiment of the invention, applicable to both the first and second embodiments described above, the surface layer includes plastic pigment particles having an average particle size of more than 100 nm, in addition to the thermoplastic polymer latex particles having an average particle size of less than 100 nm and, optionally, a lubricant.

DESCRIPTION OF THE PREFERRED EMBODIMENTS

Figure 1:
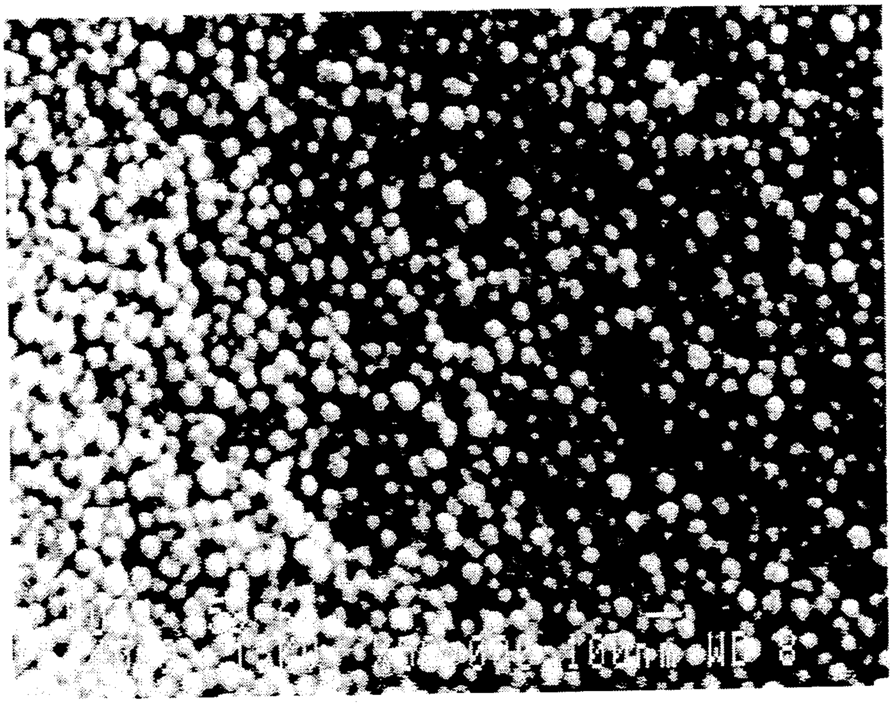
FIG. 1 shows an electron microphotograph (50,000×) of the surface of the coated printing paper in Example 4.

As printing base materials, there are used papers, synthetic papers, plastic films, non-woven clothes and the like. Among the above materials, papers are widely used. Papers are classified as pigment coated papers, such as art paper, coated paper, slightly coated paper, coated white board, etc., and as non-coated papers, such as wood free paper, wood containing paper, newsprint paper, glazed paper, supergravure paper, etc. In order to provide both high gloss and superior printability, the base material of the present invention must have a pigmented layer on the substrate selected from the above-described base-materials.

Therefore, the substrate of the present invention can include pigment coated papers and non-coated papers, such as wood containing paper, and wood free paper, etc. on which a pigment layer is applied. The process for forming a pigment layer on an uncoated paper can be carried out by the conventional process for producing a pigmented layer on paper, but the pigment in the coating material, the kind of binder, and the ratio of binder to pigment can be varied depending upon the desired quality. Paper having a coating on one or both sides (having a coating of 2–40 $g/m^2$ per side) can be used as the pigment coated paper of the present invention. After the pigment coating color layer is applied, a thermoplastic polymeric latex is applied on the pigmented layer to prepare the surface layer. Before the latex coating, the pigmented layer can optionally be smoothed by means of a super calender, gloss calender, and the like.

The application of thermoplastic polymeric latex on a non-coated paper (as base material) provides good printability, but not a high gloss.

The thermoplastic latex layer on a synthetic paper or plastic film (as base material) provides a poor printability due to the dryability problems.

The thermoplastic polymeric latex as used in the present invention is an emulsion of thermoplastic polymer or copolymer (hereinafter referred to as "polymeric latex") having a second order transition temperature of at least 80° C. and an average particle size of smaller than 100 nm. In a core-shell type latex, the shell part preferably has a second order transition temperature of at least 80° C. The polymer latexes having a second order transition temperature of at least 80° C. are used in the present invention regardless of the monomer species and the production process employed. The preferred monomers include, for example, styrene, derivatives thereof, e.g. methylstyrene, vinylstyrene, etc.; vinylidene chloride; acrylates or methacrylates, e.g. methylacrylate, ethylacrylate, butylacrylate, methyl methacrylate, ethyl methacrylate, acrylic acid, methacrylic acid, etc.

The upper limit of the second order transition temperature is not otherwise limited, but may be selected depending upon the monomer species, and the additives such as plasticizer, for producing the polymeric latex. In general, this upper limit is about 130° C.

The use of the polymeric latex having a second order transition temperature below 80° C. causes an adhesion of the coating to the calender roll, (when used), and results in a coated paper with insufficient gloss, low surface strength and poor printability.

The objectives of the present invention are not achieved with coated papers having these defects.

In general, the average particle size of latex used for paper coating is 100–500 nm, and smaller than the latex used in other fields, such as paint. In the present invention, it is preferred that the polymeric latex has an average particle size of smaller than 100 nm. When the polymeric latex having an average particle size of smaller than 100 nm is used, gloss of the resultant paper without smoothing treatment is as high as supercalendered coated papers with smoothing treatment by means of super calender, gloss calender, and the like. The lower limit of the latex particle size is not particularly limited, but will generally be about 5 nm, more generally at least about 30 nm.

The plastic pigments which may be used in the present invention are particle-shape (including hollow-sphere structure) synthetic polymer having an average particle size of larger than 100 nm. The particles of the plastic pigment may consist predominantly or entirely of polystyrene, and do not have substantial binding power by themselves. A typical plastic pigment is Ropaque OP-84, which has a hollow-spherical structure, manufactured by Rohm and Haas Company. A kind of plastic pigment which is called "binder pigment" is commercially available. The binder pigment has a binding power to some extent, however, the binding power is not sufficiently high. The binding power of binder pigment is almost at a level to compensate the additional mount of other binders required to bind the plastic pigment particles. A typical binder pigment is Nipol Lx-407BP manufactured by Nippon Zeon Co., Ltd.

The polymeric latex of the present invention is applied as the sole coating on the pigmented layer. Various additives can be added to the polymeric latex in amounts which do not detract from the purpose of the present invention. Additives which can be used are as follows: fluidity adjusting agent for the control of coating suitability, defoamers, lubricants to prevent adhesion to calender rolls, coloring agents for the coloration of a coating layer surface, plastic pigments having average particle sizes of larger than 100 nm for the development of gloss, a small amount of inorganic pigments, and the like. In the case plastic pigment is mixed, it is suitable to use plastic pigment in an amount of 0.1 to 60% (by weight of the surface layer), preferably 20–40% (by weight of the surface layer), in order to optimize the gloss development and the strength of the resultant coating layer. The above additives can be selected from those well known in the art and can be mixed in appropriate amounts to prepare a coating material suitable for use as a surface layer. Preferred lubricants include, for example, higher fatty acids and derivatives, e.g. salts, esters, amides, etc., thereof, such as oleic acid, sodium oleate, stearic acid, calcium stearate; polyethylene wax emulsion; and mixtures thereof.

The resultant coating material for the surface layer is applied on the pigmented layer, thereby to produce a surface layer. The amount of the coating applied can be suitably adjusted to obtain a desired quality. With a large amount of the coating material, production costs are increased, ink absorbency is reduced, ink set is insufficient, and the strength of the surface layer is lowered. Accordingly, the use of a large amount of the coating is not advantageous. In ordinary cases, it is suitable to use a coating in an amount of at least 0.1 $g/m^2$, preferably 0.3 to 3 or 4 $g/m^2$ on one side of a coated paper.

The coating material for the surface layer can be applied by means of conventional equipment used in paper coating, for example, by a blade coater, roll coater, air knife coater, bar coater, gravure coater, flexo coater, and the like. When the polymeric latex of the present invention is used, the drying of this coating requires no specific equipment, and can be carried out with drying systems conventionally used for the production of coated papers.

The obtained surface layer does not required but may be treated with a calender to prepare a high gloss level. The type of calendering used is not otherwise limited, and a super calender and/or gloss calender used for smoothing a coated paper are generally employed. However, the calender treatment, of which the conditions are important, must be made at a temperature below the second order transition temperature of the polymeric latex used as the surface layer. Any temperature below the second order transition temperature can be used. However, it is preferred to use a temperature at least 5° C. lower, more preferably 10° to 30° C. lower, than the second order transition temperature.

It is unknown why the coated printing paper of the present invention has both superior printability and high gloss. However, observations of the glazed surface layer of the present invention have been made as described below.

FIG. 1 shows an electron microscopic photograph of the surface layer of the coated printing paper produced by the process of the present invention. As seen in FIG. 1, the surface layer does not consist of a uniform film formed by melting a polymeric latex. Instead the surface layer has a structure in which polymeric latex particles of from about several to ten nanometers are separated from each other. This photograph of FIG. 1, shows that the polymeric latex, owing to its high second order transition temperature of at least 80° C., has the same form and size of particles as the latex coating material, and with the conventional drying conditions and the subsequent calender treatment (below the second order transition temperature), the surface coating has not melted to form a continuous film. There appears to be many voids between polymeric latex particles, so that a printing ink fills in the voids and passes through the capillaries formed between the latex particles. Consequently, printing ink penetrates the latex coating and reaches the pigmented layer, where it is absorbed.

Figure 2:
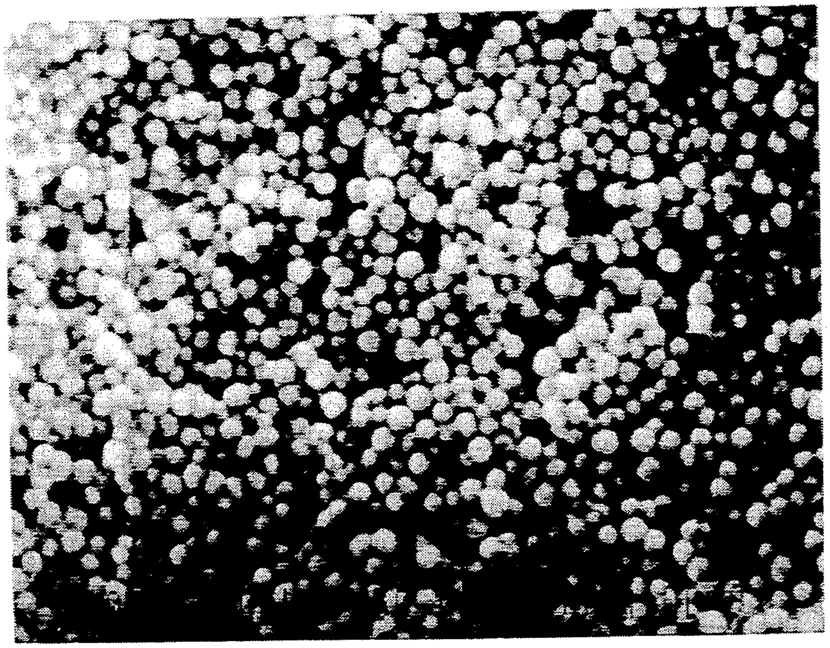
FIG. 2 shows an electron microphotograph (50,000×) of the surface of the coated printing paper in Example 1.

It has been found that the surface layer has the form and size of the latex particles without melting as shown in FIG. 1 and in FIG. 2, and the surface layer has no film strength. However, the glazed surface layer of the present invention has sufficient strength. The reason for the sufficient strength is unknown, but it is believed that the polymeric latex having a second order transition temperature of at least 80° C. and an average particle size of smaller than 100 nm has a certain hardness. Accordingly, the application of the latex on the pigmented layer causes complicated effects of the properties, such as packing, elasticity, etc. of a pigment coated layer, the properties of the polymeric latex determined, for example, by hardness particle size, coating amount, etc., and the mutual chemical affinities of latex particles. That is, it is believed that the increase of the surface strength is due to the above complicated interactions. Considering the conventional view that a practically uniform continuous surface is required to obtain a high gloss, it is unexpected that the surface of the polymeric latex provides a high gloss despite retaining the particle form. Based on the above photograph, the reason seems to be that the cavities in the pigmented layer are filled with the small sized polymeric latex particles, so that the resulting surface layer is optically smoother.

Considering that the surface layer of the coated printing paper in Comparative Example 5 described hereinafter has a particle size of polymeric latex of less than 100 nm (i.e. 75 nm) as seen in Table 1, it is believed that there are other factors which relate to the mechanism of the effects of the present invention. However, it is unknown what these factors are.

Since, in the production of a coated printing paper, the drying and calendering conditions are the same as those used in the production of commercial coated papers, a coated paper having a certain standard quality is produced without damaging the productivity.

The following examples serve to illustrate the present invention in more details although the present invention is not limited to the examples. Unless otherwise indicated, all parts and percentages are by weight.

EXAMPLES

The production of polymeric latex for over-coating

Preparation Example 1

300 parts of water, 9 parts of sodium dodecylbenzene sulfonate and 4 parts of polyoxyethylene nonyl phenyl ether (10 moles of ethylene oxide addition) were placed in a four-necked flask equipped with a stirrer, a thermometer, a cooler, a dropping funnel and a nitrogen gas inlet, and then mixed to prepare a mixed substance (I).

80 parts of styrene, 10 parts of $\alpha$-methylstyrene, and 100 parts of methyl methacrylate were mixed to prepare a monomer mixture. 60 parts of a monomer mixture were added to the mixed substance (I), and were heated to 60° C. in a nitrogen atmosphere. Further, 7.2 parts of 20% aqueous ammonium persulfate solution and 4.8 parts of 20% anhydrous sodium bisulfite solution were added thereto and polymerized for 60 minutes. After adding 10 parts of 20% aqueous ammonium persulfate solution, 140 parts of the above monomer mixture were added dropwise thereto for one hour, and were maintained at 90° C. for 4 hours. After the completion of polymerization, a copolymeric latex (A) of ethylenic monomers having a second order transition temperature of 107° C., an average particle size of 75 nm, and a solid content of 39% was obtained.

Preparation Example 2

310 parts of water, 5.6 parts of ammonium polyoxyethylene nonyl phenyl ether sulfate (HITENOL N-03, manufactured by DAIICHI KOGYO SEIYAKU CO., LTD.), 48 parts of styrene, 19 parts of methyl methacrylate, 8 parts of ethyl methacrylate, 2.5 parts of divinyl benzene and 2.5 parts of methacrylic acid were placed in a four-necked flask equipped with a stirrer, a thermometer, a cooler, a dropping funnel, and were heated to 70° C. under a nitrogen atmosphere. 5 parts of 16% aqueous potassium persulfate solution were added thereto and maintained at 85° C. for 4 hours. After the completion of polymerization, a copolymeric latex (B) of ethylenic monomers having a second order transition temperature of 85° C., and average particle size of 67 nm, and a solid content of 21.1% was obtained.

Preparation Example 3

The same procedure as that of Preparation Example 1 was carried out except that 88 parts of styrene, 38 parts of methylmethacrylate, 70 parts of n-butylmethacrylate and 4 parts of methacrylic acid were used instead of the monomers of Preparation Example 1, wherein a copolymeric latex (C) having a second order transition temperature of 68° C., an average particle size of 70 nm, and a solid content of 39% was obtained. Preparation of a base material (a coated paper).

70 parts of U.S. No. 1 kaolin clay, 30 parts of fine ground calcium carbonate, 13 parts (solid content) of styrene-butadiene copolymeric latex and 5 parts (solid content of a 35%) aqueous starch solution were mixed to produce a coating color of a 64% solid content. The coating color was applied to a wood free base paper of a basis weight of 127 g/m$^2$ in an amount of 14 g/m$^2$ per side (dry basis) by means of a blade coater with a coating speed of 500 m/min. After drying, a base material having a 5.5% moisture content for top-coating (a pigment coated paper) having a pigment coated layer was obtained.

EXAMPLE 1

100 parts (solid content) of copolymeric latex (A) having a second order transition temperature of 107° C. and an average particle size of 75 nm, and water were mixed to produce a top coating solution of a 30% solid content. The resultant coating solution was applied in an amount of 1.6 g/m$^2$ per side (dry basis) on the above described base material (pigment coated paper) with a blade coater at a speed of 500 m/min. After drying, top coated paper of a 6.5% moisture content was obtained. In this manner, a coater paper according to the present invention, without calendering, was obtained. The surface of the coated paper is shown in the electron microphotograph of FIG. 2.

COMPARATIVE EXAMPLES 1 AND 2

Comparative Example 1 was a pigment coated paper used as the base material of Example 1. The base material (pigment coated paper) without the copolymeric latex (A) surface layer, was treated under a nip pressure of 180 kg/cm through two nips of a supercalender consisting of chilled rolls and cotton rolls so as to contact the top coated surface with the metal roll.

Comparative Example 2 was carried out at chilled roll temperature of 82° C.

EXAMPLE 2, AND COMPARATIVE EXAMPLE 3

Examples 2 was carried out in the same manner as in Example 1, except for using a 30% coating solution containing 70 parts (solid content) of the copolymeric latex (A), 30 parts (solid content) of plastic pigment (Ropaque OP-84, Rohm and Haas Company). Comparative Example 3 was carried out in the same manner as in Example 1, except for using a 30% coating solution containing 30 parts (solid content) of the copolymeric latex (A) and 70 parts (solid content) of plastic pigment (Ropaque OP-84).

EXAMPLE 3 AND COMPARATIVE EXAMPLE 4

65 parts (solid content) of copolymeric latex (A) having a second order transition temperature of 107° C. and an average particle size of 75 nm, 25 parts (solid content) of plastic pigment (Ropaque OP-84), 5 parts (solid content) of polyethylene wax emulsion type releasing agent, and 5 parts (solid content) of calcium stearate type lubricant were mixed to produce a top coating solution of 30% solids content. The resultant coating solution was applied in an amount of 1.6 g/m$^2$ per side (dry basis) on the same base material (pigment coated paper) used in Example 1. After drying, top coated paper of 6.5% moisture content was obtained. The resultant coated paper was treated under a nip pressure of 180 kg/cm at chilled roll temperature of 65° C. through two nips of a supercalender consisting of chilled rolls and cotton rolls so as to contact the top coated surface with the metal roll. In this manner, a coated paper according to the second embodiment of this invention having a high gloss was obtained.

Comparative Example 4 was carried out in the same manner as in Example 3, except for using a top coating solution consisting of 25 parts (solid content) of copolymeric latex (A) having a second order transition temperature of 107° C. and an average particle size of 75 nm, 65 parts (solid content) of plastic pigment (Ropaque OP-84), 5 parts (solid content) of polyethylene wax emulsion type releasing agent, and 5 parts (solid content) of calcium stearate type lubricant.

EXAMPLES 4,5, AND 6, AND COMPARATIVE EXAMPLE 5

90 parts (solid content) of copolymeric latex (A) having a second order transition temperature of 107° C. and an average particle size of 75 nm, 5 parts (solid content) of polyethylene wax emulsion type releasing agent, and 5 parts (solid content) of calcium stearate type lubricant were mixed to produce a top coating solution of a 30% solids content. The resultant coating solution was applied in an amount of 1.6 g/m$^2$ per side (dry basis) on a base material (pigment coated paper). After drying, top coated paper of a 6.5% moisture content was obtained. The resultant coated paper was treated under a nip pressure of 180 kg/cm through two nips of a supercalender consisting of chilled rolls and cotton rolls so as to contact the top coated surface with the metal roll. In this manner, a coated paper having a high gloss was obtained.

Example 4 and 5 were carried out at chilled roll temperature of 65° C. and 82° C., respectively. The surface of the coated paper of Example 4 is shown in the electron microphotograph of FIG. 1. On the other hand, in Example 6 and Comparative Example 5, the top coated paper was treated under a nip pressure of 1000 kg/cm through two nips of a gloss calender consisting of chilled rolls and heat-resistant rolls, so as to contact the top coated surface with the metal roll. Example 6 was carried out at a chilled roll temperature of 95° C., and Comparative Example 5 was carried out at a chilled roll temperature of 120° C., i.e. a temperature higher than the second order transition temperature of copolymeric latex (A).

EXAMPLES 7, 8, AND 9

The top coating solution and base paper in Example 5 were used, and supercalendering conditions, including a roll temperature of 82° C. were carried out in the same manner as in Example 2, wherein one to several coating layers were applied by means of a blade coater (manufactured by Kumagaya Riki Co.) to produce a paper having a high gloss. Examples 7, 8, and 9 had top coating weights of 0.7 g/m$^2$, 2.8 g/m$^2$, and 5.5 g/m$^2$, respectively.

EXAMPLES 10 AND 11, AND COMPARATIVE EXAMPLE 6

Examples 10 and 11, and Comparative Example 6 were carried out in the same manner as in Examples 4–6, and Comparative Example 5, except for using a 20% coating solution which contained 80 parts (solid content) of the copolymeric latex (B) having a second order transition temperature of 85° C. and an average particle size of 67 nm, 10 parts (solid content) of polyethylene wax-type lubricant, 10 parts (solid content) of calcium stearate-type lubricant and except for using a coating amount of 1.2 g/m$^2$ per side (dry basis). In this manner, top coated papers of high gloss were obtained.

Examples 10 and 11 were carried out at chilled roll temperatures of 65° C. and 82° C., respectively, (lower temperature than the second order transition temperature of the copolymeric latex), and Comparative Example 6 was carried out at a chilled roll temperature of 120° C., a temperature higher than the second order transition temperature of the copolymeric latex.

COMPARATIVE EXAMPLES 7 AND 8

Comparative Examples 7 and 8 were carried out in the same manner as in Examples 4 and 6, except for using the copolymeric latex (C) having a second order transition temperature of 72° C. and an average particle size of 70 nm, and a coating amount of 1.4 g/m$^2$ per side (dry basis), wherein high gloss papers were obtained. Comparative Example 7 was made at a chilled roll temperature of 65° C., i.e. a temperature lower than the second order transition temperature. Comparative Example 8 was carried out at a chilled roll temperature of 95° C., a temperature higher than the second order transition temperature.

COMPARATIVE EXAMPLE 9

The top coating solution of Example 10 using the copolymeric latex (B) was applied to an uncoated wood free paper having a weight of 127 g/m$^2$ in an amount of 2.6 g/m$^2$ per side, and was treated in the same manner as in Example 10 by means of a super calender consisting of chilled rolls and cotton rolls adjusted to a temperature of 82° C., to obtain a top coated paper.

COMPARATIVE EXAMPLE 10

On the base material having a pigmented layer used in Examples 4–6, there was applied a 30% top coating solution composed of 70 parts (solid content) of copolymeric latex (B), 25 parts (solid content) of the pigment used for application of pigment material used for application of pigmented layer on the base material, and 5 parts (solid content) of calcium stearate type lubricant in an amount of 8.7 g/m$^2$ per side. The resultant upper-coated paper was treated in the same manner as in Example 11 by means of a calender to prepare a high gloss paper.

The coated paper obtained in the Examples and Comparative Examples were tested and evaluated for their qualities. In the test results, with the copolymeric latexes, the surface temperature of metal rolls in the calender-treatment is shown in Table 1.

The text methods and evaluations are as follows:

GLOSS OF UNPRINTED PAPER

Gloss is determined by measuring the reflectance at an angle of 60 degrees using a Murakami type gloss meter, since the reflectance at an angle of 75 degrees exhibits the fast equal gloss-values in high gloss papers. As the standard gloss of unprinted paper, the reflectances at 60 degrees and 75 degrees are shown in a superart paper (SA) and cast-coated paper (CC).

| | Reflectance at 60 degrees | Reflectance at 75 degrees |
|---|---|---|
| SA: | 54.1% | 83.6% |
| CC: | 63.6% | 84.7% |

SA: Superart paper
CC: Cast-coated paper

PRINTING GLOSS

A paper is printed by means of an RI-II type printing tester, and is measured by a Murakami-type gloss meter using a reflectance of 75 degrees.

INK SETTING

A paper is printed by a means of RI-II type tester. Than, an unprinted paper is contacted with the printed surface. The degree of ink-transfer onto the unprinted paper is evaluated visually as follows:

O means no ink transfer onto an unprinted paper
Δ means partial ink transfer
X means remarkable ink transfer.

DRY PICKING RESISTANCE

To evaluate picking resistance strength, RI-II type printing tester was used. In order to emphasize picking strength, a high tack ink (No. 20) was used. After printing, picking resistance strength was evaluated by subjective ranking.

GRAVURE PRINTABILITY

A paper was printed by gravure printing tester (manufactured by Kumagaya Kiki Co.) using a half tone gravure plate. The percentage (%) of missing dots-number, based on the total number of dots, is indicated.

As seen from the results in the following Table 1, papers of this invention have a higher gloss than superart papers. This invention provides coated printing paper which is superior in the adhesion of the polymeric latex to the calender rolls, that is, an index of the ease of production.

The Comparative Examples produced coated papers which were insufficient in some indices of printability or the adhesion to calender rolls, which means that the objects of this invention are not adhered.

EFFECTS

The coated printing paper of the present invention may be prepared by a process which comprises forming on a substrate a pigmented layer, applying thereon a thermoplastic polymeric latex, the particles of which have a second order glass transition temperature of at least 80° C. and an average particle size of smaller than 100 nm to prepare the surface-layer, and drying the resulting paper. The process of the present invention provides glossy paper with good printability as compared with a calendered conventional coated paper. When smoothing treatment at lower temperature than second-order transition temperature of the copolymeric latex was performed, the process of the present invention provides a higher gloss paper than super-art papers, and a superior productivity without the adhesion of the paper to calender rolls.

| | Base Paper | Kind of polymeric latex of prsent invention (Tg °C.) | Parts of polymeric latex of present invention (%) | Parts of plastic pigment (%) | Parts of lubricants or releasing agents (%) | Coat weight of top-coating (g/m$^2$) | Kind of calender (Roll Temp.) (°C.) | Adhesion to calender | Sheet gloss Reflectance at 60 degrees (%) | Print gloss Reflectance at 75 degrees (%) | Ink setting | Dry picking resistance | Percentage missing dots-number |
|---|---|---|---|---|---|---|---|---|---|---|---|---|---|
| Example 1 | Pigmented coated paper | A(107) | 100 | 0 | 0 | 1.6 | — | — | 20.3 | 70.2 | ○ | | High |
| Comparative Example 1 | Pigment coated paper | — | — | — | — | 0 | — | — | 7.3 | 45.6 | ○ | High | |
| Comparative Example 2 | Pigment coated paper | — | — | — | — | 0 | Super(82) | No Adhesion | 21.5 | 71.5 | ○ | High | |
| Example 2 | Pigment coated paper | A(107) | 70 | 30 | 0 | 1.6 | — | — | 22.2 | 72.2 | ○ | High | |
| Comparative Example 3 | Pigment coated paper | A(107) | 30 | 70 | 0 | 1.6 | — | — | 20.8 | 71.8 | X | Low | |
| Example 3 | Pigment coated paper | A(107) | 65 | 25 | 10 | 1.6 | Super(82) | No Adhesion | 71.8 | 93.1 | ○ | High | |
| Comparative Example 4 | Pigment coated paper | A(107) | 25 | 65 | 10 | 1.6 | Super(82) | No Adhesion | 67.1 | 86.6 | ○ | Low | |
| Example 4 | Pigment coated paper | A(107) | 90 | 0 | 10 | 1.6 | Super(65) | No Adhesion | 63.9 | 89.0 | ○ | High | 0.11 |
| Example 5 | Pigment coated paper | A(107) | 90 | 0 | 10 | 1.6 | Super(82) | No Adhesion | 71.5 | 92.2 | ○ | High | |
| Example 6 | Pigment coated paper | A(107) | 90 | 0 | 10 | 1.6 | Gloss(92) | No Adhesion | 62.9 | 88.6 | ○ | High | |
| Comparative Example 5 | Pigment coated paper | A(107) | 90 | 0 | 10 | 1.6 | Gloss(120) | Adhesion | 44.7 | 64.1 | ○ | Medium | 4.30 |
| Example 7 | Pigment coated paper | A(107) | 90 | 0 | 10 | 0.7 | Super(82) | No Adhesion | 68.4 | 90.8 | ○ | High | |
| Example 8 | Pigment coated paper | A(107) | 90 | 0 | 10 | 2.8 | Super(82) | No Adhesion | 72.3 | 93.0 | Δ | High | |
| Example 9 | Pigment coated paper | A(107) | 90 | 0 | 10 | 5.5 | Super(82) | Partial Adhesion | 58.4 | 85.7 | Δ | High | 1.25 |
| Example 10 | Pigment coated paper | A(107) | 80 | 0 | 20 | 1.2 | Super(65) | No Adhesion | 65.1 | 87.6 | ○ | High | 0.11 |
| Example 11 | Pigment coated paper | B(85) | 80 | 0 | 20 | 1.2 | Super(82) | No Adhesion | 73.4 | 95.4 | ○ | High | |
| Comparative Example 6 | Pigment coated paper | B(85) | 80 | 0 | 20 | 1.2 | Super(120) | Adhesion | 38.8 | 56.8 | Δ | Medium | |
| Comparative Example 7 | Pigment coated paper | C(68) | 90 | 0 | 10 | 1.4 | Super(65) | Partial Adhesion | 51.3 | 70.4 | Δ | Low | 3.22 |
| Comparative Example 8 | Pigment coated paper | C(68) | 90 | 0 | 10 | 1.4 | Gloss(95) | Adhesion | 32.2 | 49.5 | X | Low | |
| Comparative Example 9 | Pigment coated paper | B(85) | 80 | 0 | 20 | 2.6 | Super(82) | No Adhesion | 15.8 | 36.5 | ○ | Low | 8.51 |
| Comparative Example 10 | Pigment coated paper | B(85) | 70 | 25 (pigment color) | 5 | 8.7 | Super(82) | No Adhesion | 53.4 | 80.3 | ○ | High | 0.12 |

Note:
Un-printing gloss of art paper and cast coated paper (Reflectance at 60 degree)
Super art (SA Kanafun) 54.1%
Cast coat (Miror coat platiunum) 63.6%

What is claimed is:

1. A coated printing paper comprising a paper substrate having a pigmented layer on at least one surface thereof, and superposed on said pigmented layer, a surface-layer comprising a thermoplastic polymeric latex having a second order transition of temperature of at least 80° C. and an average particle size of smaller than 100 nm, wherein said coated printing paper is not post-calendared.

2. The coated printing paper of claim 1, wherein the surface layer comprises a mixture including more than 40% (by weight) of thermoplastic polymeric latex particles having a second order transition temperature of at least 80° C. and an average particle size of smaller than 100 nm, and no more than 60% (by weight) of plastic pigment particles having an average particle size of larger than 100 nm.

3. The coated printing paper of claim 1 or claim 2, wherein the amount of applied coating in the surface layer is 0.3 to 4 $g/m^2$.

4. A coated printing paper comprising (A) a paper substrate having a pigmented layer on at least one surface thereof, and superposed on said pigmented layer, (B) a surface layer comprising a mixture of thermoplastic polymeric latex particles having a second order transition temperature of at least 80° C. and an average particle size of smaller than 100 nm, and 5–40% by weight of at least one lubricant wherein the amount of applied coating on the surface layer is 0.3 to 4.0 $g/m^2$ and the surface layer is calendared at a temperature less than said second-order transition temperature.

5. The coated printing paper as set forth in claim 4 wherein said mixture further comprises no more than 60% by weight of plastic pigment particles having an average particle size larger than 100 nm and wherein the latex particles having a second order transition temperature of at least 80° C. and average particle size of smaller than 100 nm comprise more than 40% of said mixture.

6. The coated printing paper as set forth in claim 5 wherein said plastic pigment particles are present in an amount of from about 0.1 to 60% by weight of surface layer.

7. The coated printing paper of claim 4, wherein said at least one lubricant is selected from the group consisting of stearic acid, derivatives thereof, oleic acid, derivatives thereof, polyethylene wax emulsion, and mixtures thereof.

8. The coated printing paper of claim 1 or 4, wherein the amount of coating applied in the pigmented layer is from about 2 to 40 $g/m^2$.

9. The coated printing paper of claim 4, wherein the surface layer is treated with a calender at a temperature of about 10°–30° C. lower than said second-order transition temperature of the polymeric latex.

* * * * *